(12) United States Patent
Vaniglia

(10) Patent No.: US 8,360,126 B2
(45) Date of Patent: Jan. 29, 2013

(54) TOW EJECTOR FOOT FOR A FIBER PLACEMENT HEAD

(75) Inventor: Milo M. Vaniglia, Cold Spring, KY (US)

(73) Assignee: MAG IAS, LLC, Sterling Heights, MI (US)

( * ) Notice: Subject to any disclaimer, the term of this patent is extended or adjusted under 35 U.S.C. 154(b) by 142 days.

(21) Appl. No.: 12/825,908

(22) Filed: Jun. 29, 2010

(65) Prior Publication Data

US 2011/0315324 A1 Dec. 29, 2011

(51) Int. Cl.
*B32B 37/00* (2006.01)
*B32B 38/04* (2006.01)
*B32B 38/10* (2006.01)
*B29C 65/00* (2006.01)
*B26D 7/06* (2006.01)

(52) U.S. Cl. ........ 156/517; 156/574; 156/523; 156/577; 83/26; 83/346; 83/115; 83/117; 83/331; 83/118; 83/119; 83/105; 83/107; 242/527.1; 242/532.3; 242/533.4

(58) Field of Classification Search .............. 83/26, 346, 83/115, 117, 331, 118, 119, 105, 107; 156/353, 156/517, 555, 557, 574, 523, 577; 242/527.1, 242/532.3, 533.4
See application file for complete search history.

(56) References Cited

U.S. PATENT DOCUMENTS

| | | | | |
|---|---|---|---|---|
| 1,751,562 | A * | 3/1930 | Stinger | 83/115 |
| 3,369,766 | A * | 2/1968 | Herman | 242/527.1 |
| 4,779,781 | A * | 10/1988 | Billberg et al. | 226/2 |
| 4,893,534 | A * | 1/1990 | Kobler | 83/107 |
| 5,111,725 | A * | 5/1992 | Simpson et al. | 83/117 |
| 5,363,728 | A | 11/1994 | Elsner et al. | |
| 6,322,020 | B1 | 11/2001 | Reisinger | |
| 6,604,444 | B1 * | 8/2003 | Belanger et al. | 83/155 |
| 2005/0103082 | A1 | 5/2005 | Farfor | |
| 2008/0302483 | A1 * | 12/2008 | Vaniglia | 156/361 |

FOREIGN PATENT DOCUMENTS
EP 1344738 A1 9/2003

OTHER PUBLICATIONS
PCT/US2011/039537 International Search Report and Written Opinion; dated: Feb. 9, 2012; 6 pages.

* cited by examiner

*Primary Examiner* — Linda L Gray
(74) *Attorney, Agent, or Firm* — Reising Ethington P.C.

(57) ABSTRACT

A motorized head for applying fiber composite material to an application surface includes a drive roll assembly for applying fiber composite material to an application surface. The drive roll assembly includes a drive roll and a backup roll and a drive roll nip formed between the drive roll and the backup roll. At least one cutter is mounted on the drive roll for cutting fiber composite material, and an ejector mechanism is mounted on the drive roll behind the cutter mechanism. The ejector mechanism positively displaces the leading end of the cut tow material away from the surface of the drive roll to ensure that the cut tow material does not misfeed as it approaches the fiber path chute downstream from the cutter.

14 Claims, 6 Drawing Sheets

TOW EJECTOR FOOT FOR A FIBER PLACEMENT HEAD

FIELD OF THE DEVICE

The device relates to a head for applying fiber composite material to an application surface in which the individual lanes of fiber composite material are each driven by a drive roll that includes a cutter for the composite material and an ejector mechanism for displacing the leading end of the cut tow material away from the surface of the drive roll.

BACKGROUND

Composite lay-up machines are well known in the art. Such machines can be divided into two basic types, fiber placement machines that lay bundles of individual fibers onto a surface, and tape laying machines that apply fiber composite material in the form of a wide tape onto a surface. If the surface that receives the fiber composite material is fairly continuous, and does not have a lot of contour, a tape laying machine is normally used. If the surface is highly contoured or discontinuous because of the presence of openings in the surface, a fiber placement machine is normally used.

SUMMARY

A fiber placement head for fiber placement utilizes individual roller sets comprising a drive roll and backup roll for each tow lane in which each drive roll has a tow cutting and restarting zone carried on the roll's circumference. Each drive roll is geared to and meshes with a back-up roll that captures the tow material in a drive roll nip that is formed therebetween. The drive roll nip receives tow from an upstream fiber path chute and delivers the tow to a downstream fiber path chute. A tow ejector foot is mounted on the drive roll immediately following each of the cutters to prevent the leading end of the cut tow from adhering to the drive roll and misfeeding into the downstream chute.

DESCRIPTION OF THE PREFERRED EMBODIMENT

Figure 1:
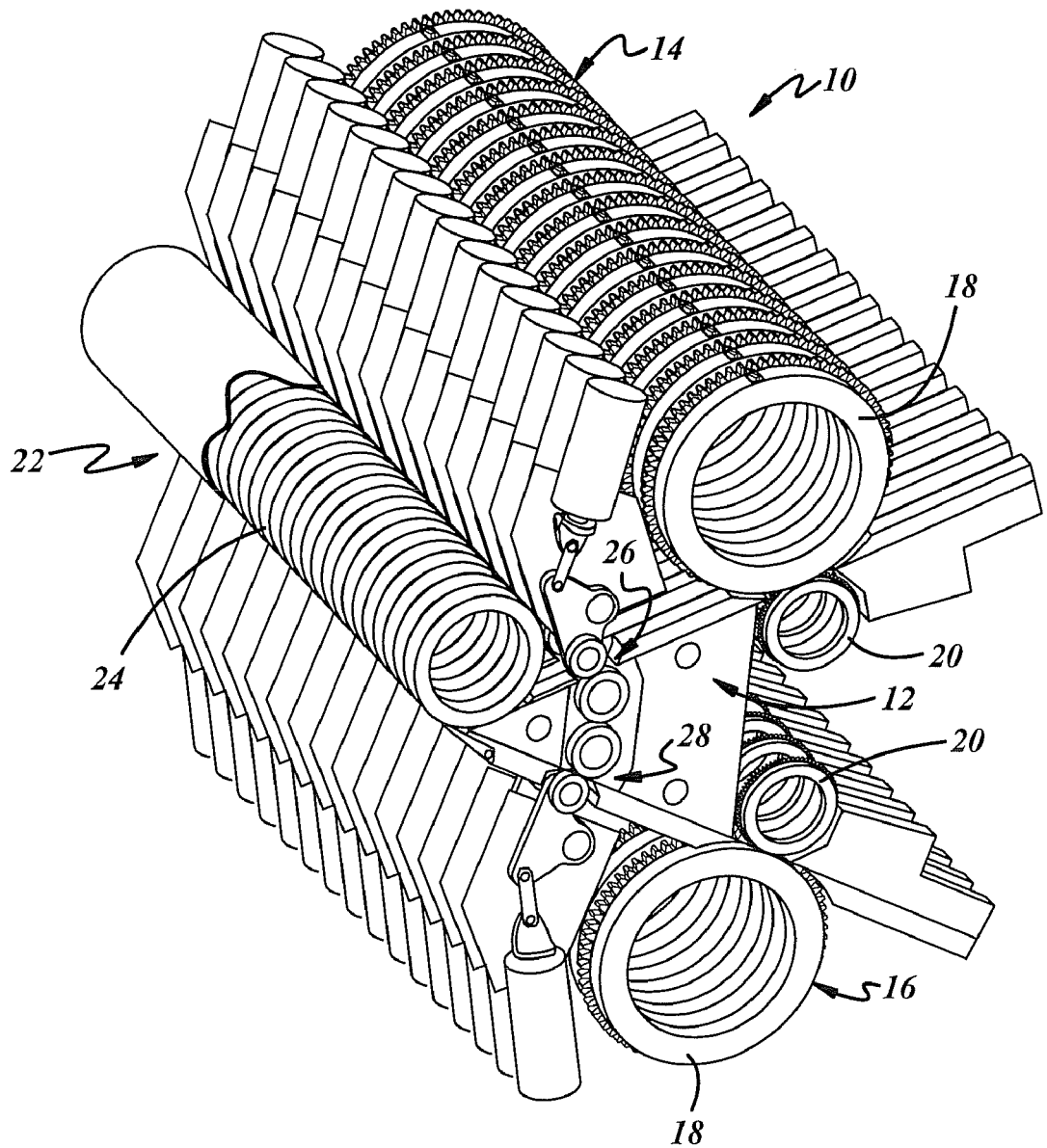
FIG. 1 is perspective view of the fiber delivery mechanism in a fiber placement head.

FIG. 1 is a perspective view of the fiber delivery mechanism 10 in a fiber placement head. The mechanism 10 comprises a frame structure 12 which supports an upper array of drive roll assemblies 14 and lower array of drive roll assemblies 16. Each drive roll assembly comprises a drive roll 18 and a back-up roll 20 that is half the diameter of the drive roll 18. Each drive roll assembly 14 and 16 feeds fiber composite material along a fiber composite path or lane to the compaction roll 22 located at the front of the frame as well known in the art. The fiber composite materials in the upper and lower lanes are interleaved at the compaction roll 22 to form a continuous layer of side-by-side strips on the application surface. The compaction roll 22 is formed by a series of side by side roller segments 24 so that the outer surface of the compaction roll may adapt to the contour of the surface to which the composite material is being applied. The frame 12 also supports an upper array of restart pinch roll assemblies 26 and a lower array of restart pinch roll assemblies 28 that are positioned between the drive roll assemblies 14 and 16, respectively, and the compaction roll 22. The restart pinch roll assemblies 26 and 28 drive the fiber composite material to the compaction roll 22 after the material has been cut by one of the cutters on the drive roll.

Figure 2:
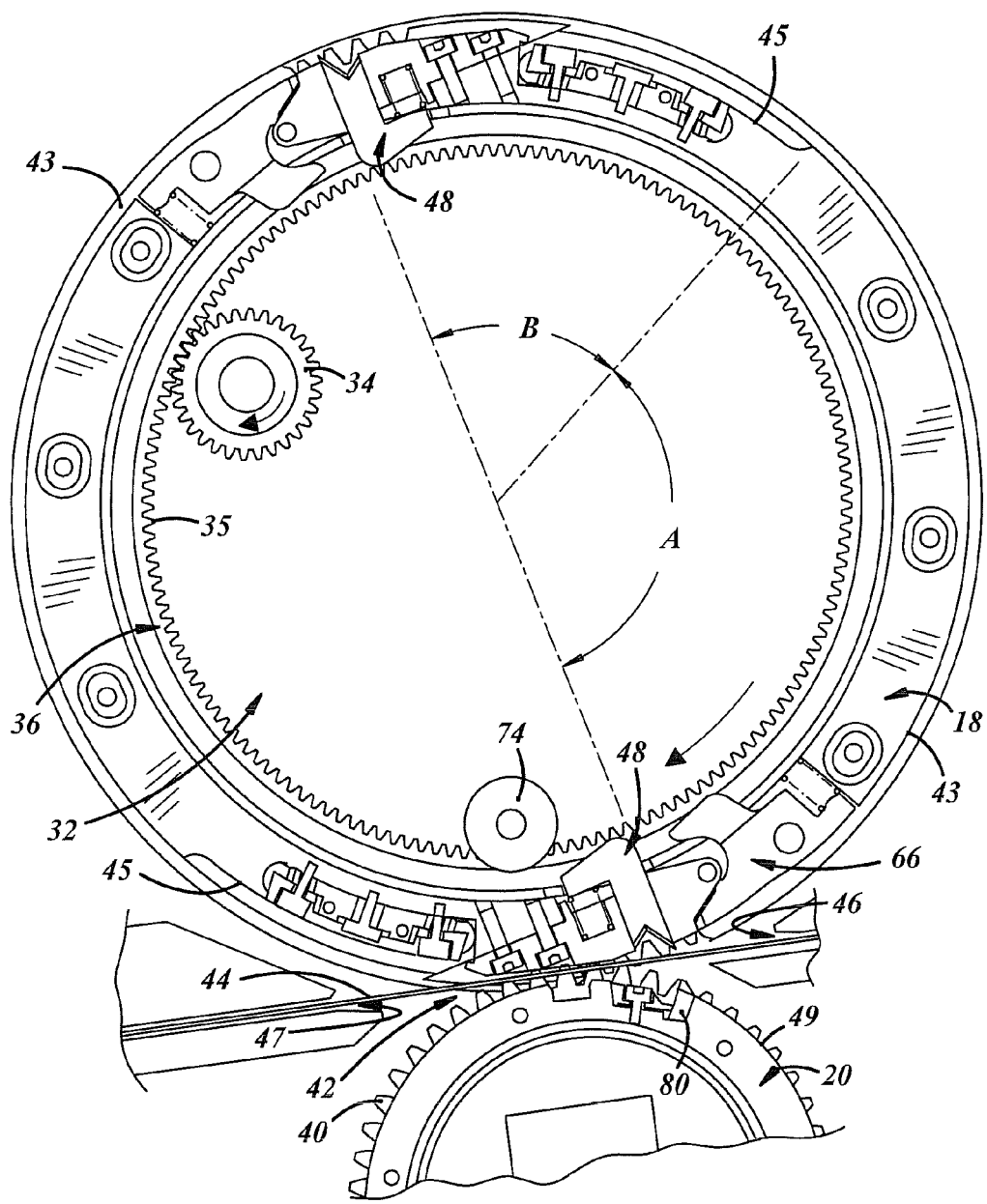
FIG. 2 is a detail of a drive roll and a portion of a backup roll.

FIG. 2 is a detail view of a drive roll 18 and a portion of a backup roll 20. The drive roll 18 is mounted by bearings (not shown) on a non-rotating drive roll hub 32 that is secured to the outside frame member 12. The drive roll 18 may be driven by a drive pinion 34 that engages the internal gear teeth 35 of a ring gear 36 that is attached to the drive roll 18. Rotation of the drive roll 18 is transferred to the backup roll 20 by a drive transfer arrangement that drivingly couples the drive roll and the backup roll together. In the embodiment shown, external gear teeth 38 on the ring gear 36, best seen in FIG. 3, engage gear teeth 40 on the outside of the backup roll 20, to positively couple the rotation of the drive roll to the backup roll. The drive roll has two cutter assemblies 48 spaced one hundred and eighty degrees apart, and a drive surface 43 is formed on the outer circumference of the drive roll following each cutter assembly as described more fully below. A tow ejector foot 66 is positioned between the cutter assembly 48 and the drive surface 43 of the drive roll. The backup roll has an anvil 80 mounted on its outer surface, and a backup drive surface 49 is formed on the outer surface of the backup roll following the anvil.

A drive roll nip 42 is formed between the drive roll 18 and the backup roll 20. Fiber tow 44 is delivered to the drive roll nip 42 from an upstream fiber path chute 46, and passes through the drive roll nip 42 into a downstream fiber path chute 47. Each cutter assembly 48 is followed by a drive zone surface 43 on a first portion of the drive roll 18 that extends counterclockwise around the surface of the drive roll. The drive zone surface 43 is formed by a circumferential portion of the drive roll that has a slightly greater radius than the remaining circumference of the drive roll so that it extends further into the drive roll nip 42. Likewise, each anvil on the backup roll 20 is followed by the backup drive surface 49 that extends partly around the circumference of the backup roll. When the drive zone surface 43 is opposite the backup drive surface 49, fiber composite material 44 that is positioned in the drive roll nip 42 is gripped and can be driven by the rotation of the drive roll 18 and the backup roll 20. The drive zone surface 43 may extend around an angle A that is between ninety and one hundred and thirty five degrees around the circumference of the drive roll, and in one embodiment, the drive zone surface extends for one hundred and thirteen degrees around the drive roll. A free zone surface 45 on a second portion of the drive roll follows the drive zone surface 43. The free zone surface 45 is positioned relative to the backup roll 20 so that when the free zone surface 45 is opposite the backup roll 20, fiber composite material 44 can be pulled freely through the drive roll nip 42 without contacting or dragging on the drive roll or the backup roll. This provides clearance for the tow to pull through the head and is sized to reduce the amount of resin from the fiber tow material that is transferred to the surface of the drive roll and the backup roll as the fiber tow is laid onto the application surface. The free zone surface 45 may extend through an angle B that is between forty-five and ninety and degrees around the circumference of the drive roll, and in one embodiment, the free zone surface 45 extends for sixty seven degrees around the drive roll.

Figure 3:
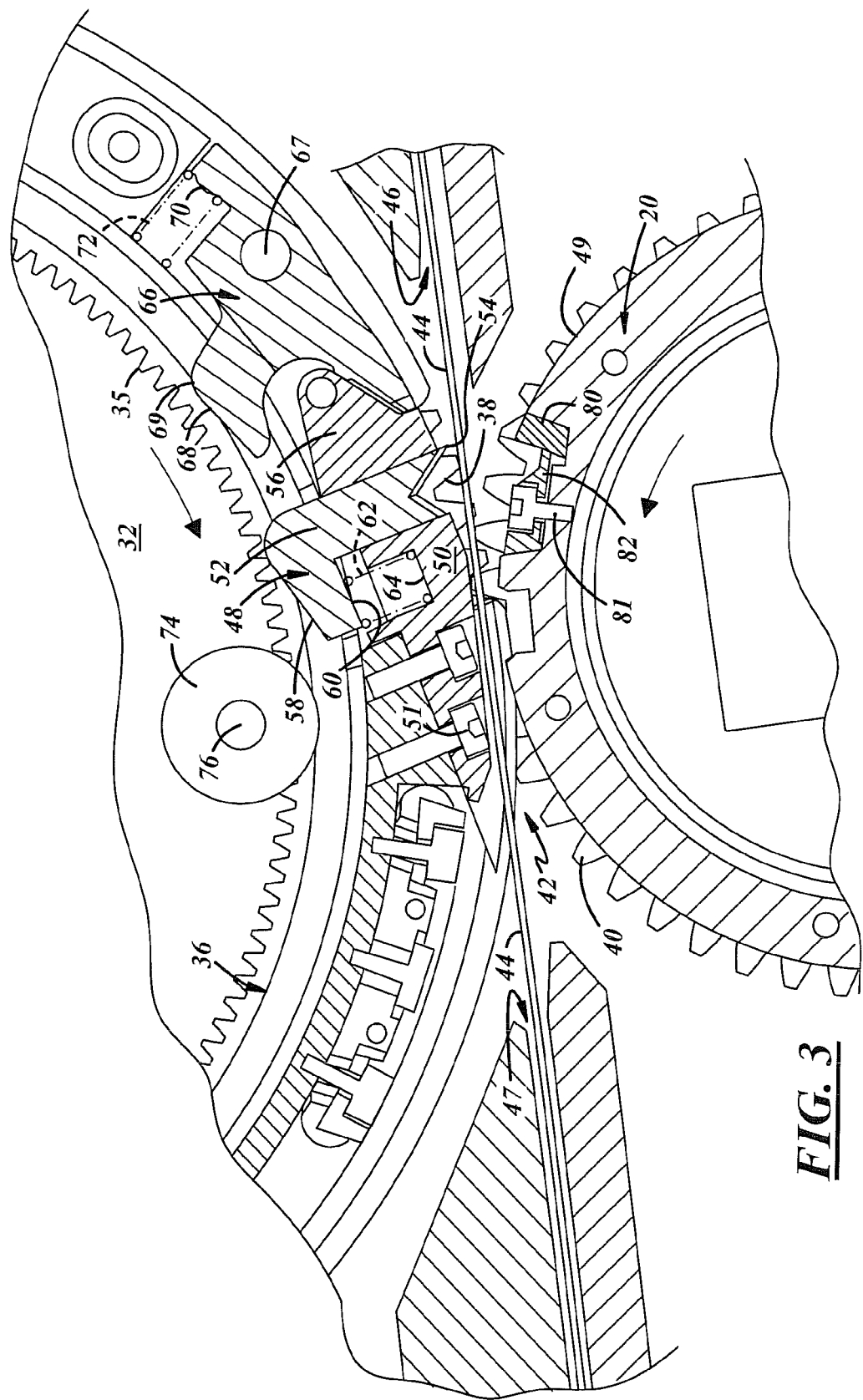
FIG. 3 is a detail view showing the drive roll in position prior to cutting the composite material.

Referring now to FIG. 3, the cutter assembly 48 comprises a cutter retainer 50 that is attached to the drive roll 18 by suitable fasteners such as screws 51 for rapid mounting and removal. A cutter blade 52 having a knife edge 54 is mounted between the cutter retainer 50 and a cutter guide insert 56. The cutter blade 52 has a ramp portion 58 and a spring retaining finger 60 that is formed below the ramp portion 58. A compression spring 62 is located in a spring pocket 64 formed in the cutter blade retainer 50, and the end of the spring 62 presses against the underside of the retaining finger 60. A tow ejector foot 66 is positioned behind the cutter blade retainer 50 and is mounted on a pivot shaft 67. The tow ejector foot 66 has a ramp surface 68 leading to a lobe 69, and a return spring seat surface 70. A compression spring 72 is mounted between the return spring seat surface 70 and another spring retaining surface (not shown) that is part of the drive roll assembly. A cam wheel 74 is mounted on a pivot 76 that is mounted on the non-rotating drive roll hub 32. The cam wheel 74 is in a position to impact on the ramp surface 58 of the cutter blade and the ramp surface 68 of the tow ejector foot 66 as these elements rotate past the cam wheel. An anvil 80 and an anvil retainer 82 are mounted on the outer circumference of the backup roll 20. The anvil retainer is held in place by a fastening element such as a screw 81. FIG. 3 shows the drive roll in a position just before the cam wheel 74 impacts on the ramp surface 58 of the cutter blade 52.

Figure 4:
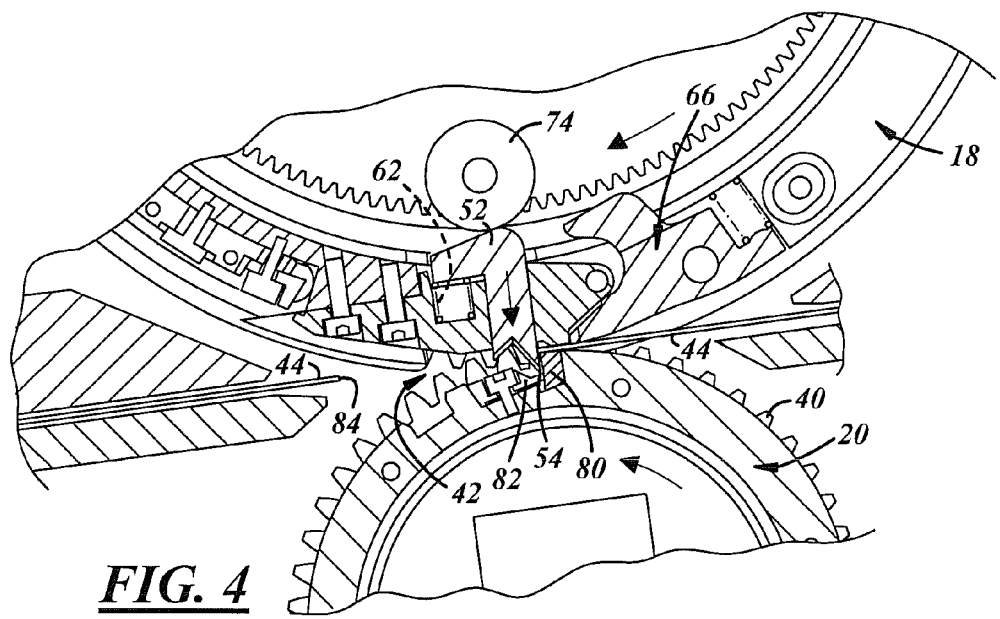
FIG. 4 is a detail view showing the drive roll as the cutter cuts the composite material.

As shown in FIG. 4, rotation of the drive roll 18 causes the cam wheel 74 to displace the cutter blade 52 against the force of the compression spring 62, extending the knife edge 54 into the composite material 44 in the drive roll nip 42. As the cutter blade 52 extends, the knife edge 54 cuts through the composite material 44 and shears against the edge of the anvil 80 that is mounted on the back-up roll 20. The synchronized rotation of the drive roll 18 and the backup roll 20 ensures that the anvil 80 is always opposite the cutter 52 when the cam wheel 74 impacts the cutter.

Although the element 80 is called an anvil, it does not function as an anvil in the sense that the knife edge 54 of the cutter blade does not cut the fiber tow 44 by pressing the fiber tow against the anvil surface. A recess is formed between the anvil 80 and the anvil retainer 82, and the knife edge 54 of the cutter blade extends into the recess as it shears the fiber tow against the edge of the anvil 80.

FIG. 4 shows the spacing between the downstream trailing end 84 of the cut tow and the cutter blade 54 exaggerated for clarity. It will be understood that once the tow 44 has been cut, the drive wheel 18 may stop for a period of time until the next length of tow is required to be fed through the drive roll nip 42. After the composite material 44 is cut, the application head continues to apply composite material to the application surface until all of the composite material between the compaction roll 22 and the cutter blade 52 has been laid onto the application surface.

Figure 5:
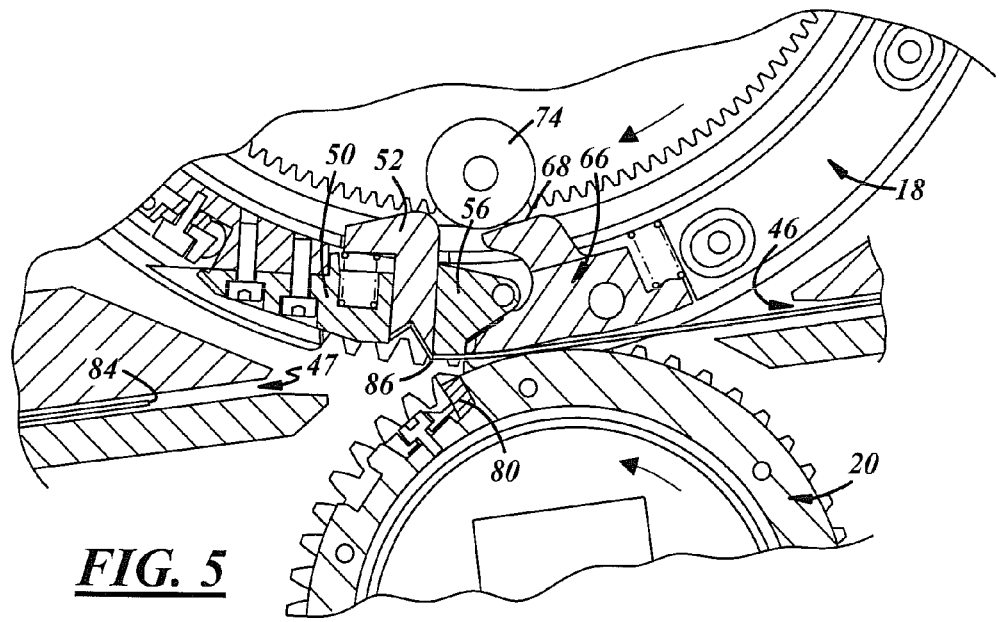
FIG. 5 is a detail view showing the drive roll after the cutter has cut the composite material prior to actuation of the tow ejector foot.

FIG. 5 shows the drive roll in a position just after the cam wheel 74 releases the cutter blade 52 as the cam wheel begins to impact on the ramp surface 68 of the ejector foot 66. The cutter blade return spring 62 retracts the cutter 52 into the pocket formed between the cutter block retainer 50 and the cutter guide insert 56. With the drive wheel in this position, the leading end 86 of the upstream tow material may follow the circumference of the drive roll surface and may be adhered to the drive roll surface immediately behind the cutter blade 52. This can be caused by tow adhesion or curl in the tow material, and may result in the leading end 86 of the tow material not entering the downstream tow chute 47.

Figure 6:
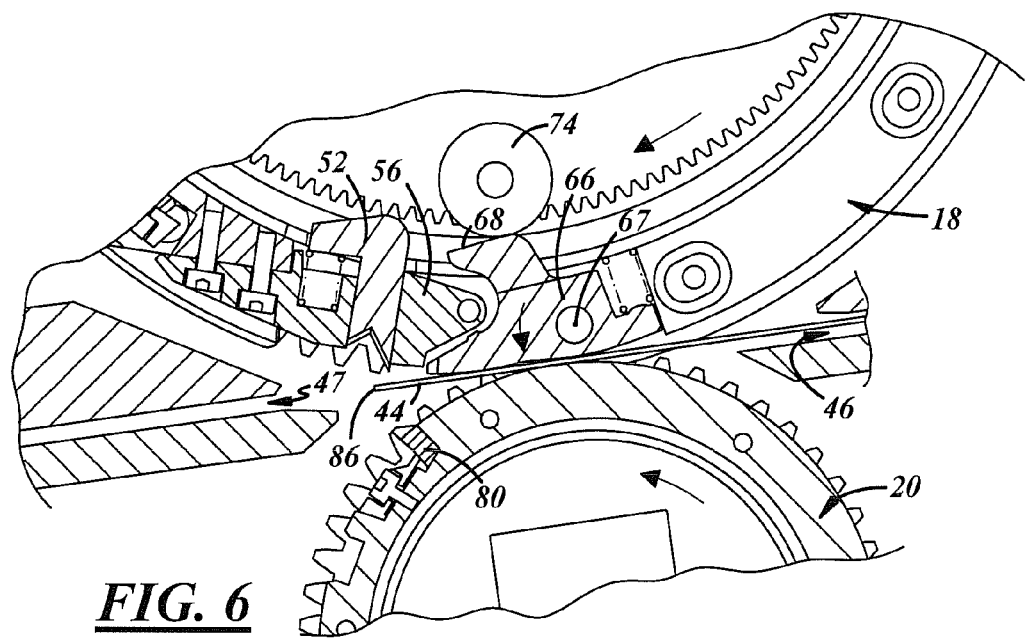
FIG. 6 is a detail view showing the drive roll as the tow ejector foot is actuated.

FIG. 6 shows the drive roll in a position in which the cam wheel 74 rides onto the ramped surface 68 of the tow ejector foot 66 and rocks the tow ejector foot relative to the pivot 67 as shown. The pivoting of the tow ejector foot 66 positively displaces the tow material 44 from the circumferential surface of the drive roll 18 and orients the leading end 86 of the tow material so that it is in alignment with the downstream fiber path chute 47.

Figure 7:
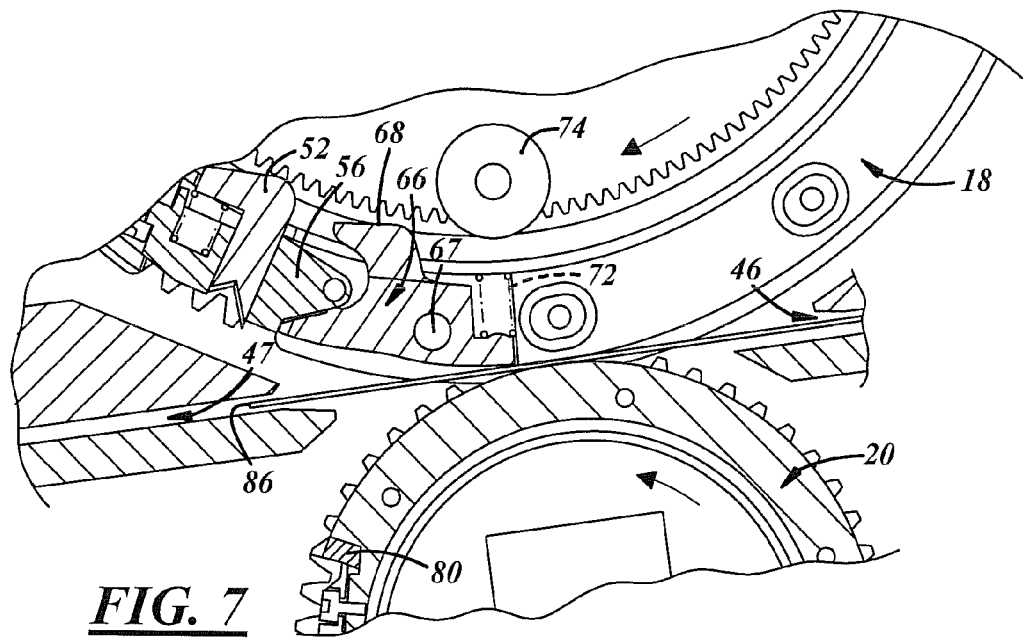
FIG. 7 is a detail view showing the tow ejector foot returned to the retracted position and the cut end of the composite material in the downstream fiber chute.

FIG. 7 shows the drive roll rotated to a position in which the wheel cam 74 is no longer in contact with the ramped surface 68 of the tow ejector foot 66. The return spring 72 has returned the ejector foot 66 to the retracted position so that it is alignment with the outer circumference of the drive roll 18, and the rotation of the drive roll 18 and the backup roll 20 has driven the leading end 86 of the tow material into the downstream tow chute 47.

Figure 8:
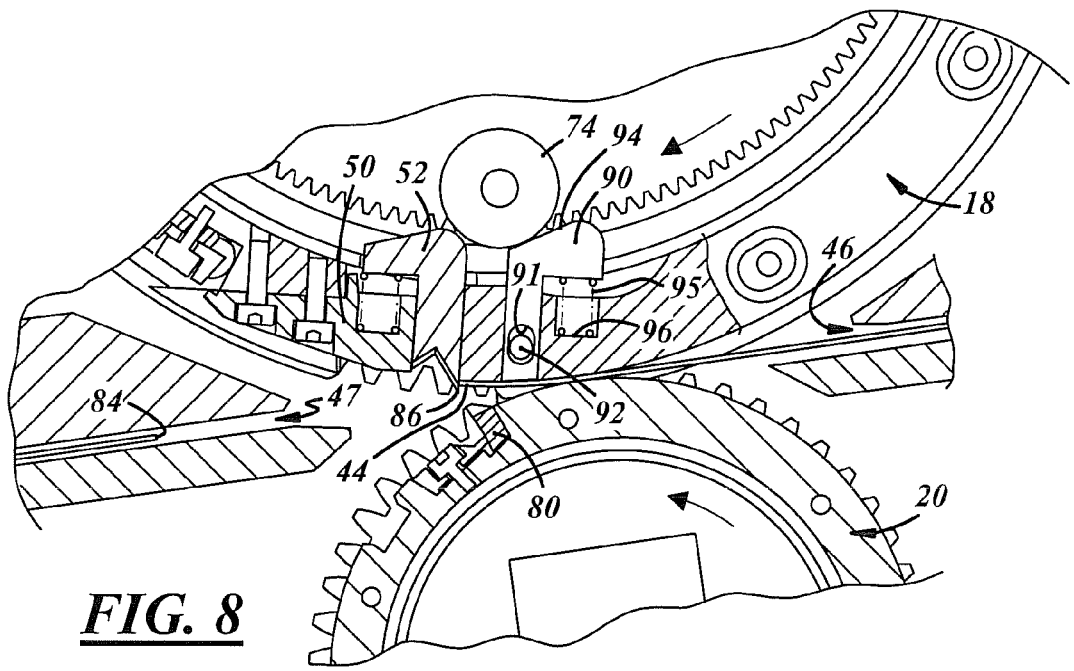
FIGS. 8 and 9 show an alternate embodiment of the invention.
Figure 9:
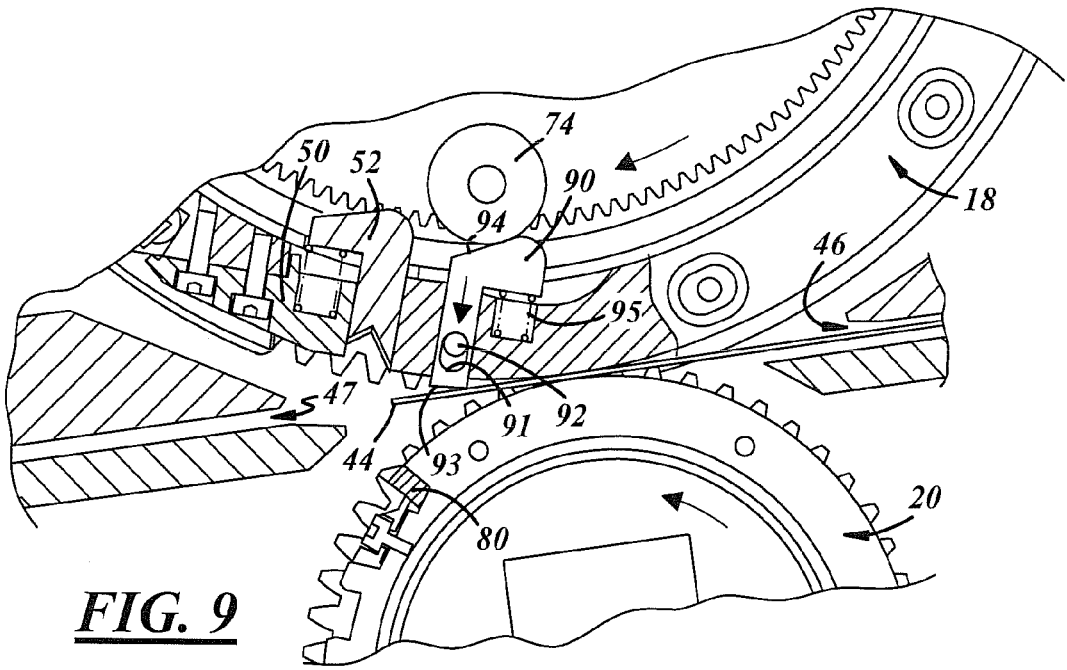

FIGS. 8 and 9 show an alternate embodiment of the invention in which the ejector foot is mounted for linear motion. The ejector foot 90 has an elongated mounting slot 91 that is mounted on a post 92 for a linear, plunging motion in a direction that is generally parallel to the motion of the cutter blade 52. The ejector foot 90 is formed with a lower foot surface 93 and a ramp 94 that comes into contact with the cam wheel 74. A return spring 95 that is mounted in a pocket 96 formed in the drive roll 18 engages the underside of the ejector foot 90 below the ramp 94 and maintains the ejector foot in a retracted position as shown in FIG. 8.

FIG. 9 shows the ejector foot 90 in an extended position as a result of the ramp 94 coming into contact with the cam wheel 74. In the extended position, the lower foot surface 93 displaces the tow material 44 from the circumferential surface of the drive roll 18 so that the tow material is in alignment with the downstream fiber path chute 47. Arrangements other than the elongated mounting slot 91 and the post 92 may be used to mount the ejector foot 90 for linear plunging motion relative to the drive roll 18.

Having thus described the invention, various modifications and alterations will be apparent to those skilled in the art, which modifications and alterations will be within the scope of the invention as defined by the appended claims.

The invention claimed is:

1. A drive roll assembly for a fiber placement head for applying fiber composite material to an application surface, the drive roll assembly comprising:
   a drive roll and a backup roll comprising the drive roll assembly;
   a drive roll nip formed between the drive roll and the backup roll;
   at least one cutter mechanism mounted on the drive roll for cutting fiber composite material;
   a cam mounted inside the outer surface of the drive roll;
   a displaceable cutter comprising the cutter mechanism, the cam actuating the displaceable cutter from a retracted position to sever the fiber composite material;
   an ejector mechanism mounted on the drive roll behind the cutter mechanism, the ejector mechanism positively displacing the leading end of the cut fiber composite material away from the surface of the drive roll;

an ejector foot comprising the ejector mechanism;

a surface on the ejector foot for engaging the cam, whereby the ejector foot is actuated from a retracted position by the cam to displace the leading end of the cut fiber composite material away from the surface of the drive roll; and, an upstream fiber path chute for delivering composite fiber to the drive roll nip; and, a downstream fiber path chute for receiving composite fiber from the drive roll nip, the upstream and downstream fiber path chutes being aligned in a straight line path with the drive roll nip, whereby the ejector mechanism displaces the fiber composite material so that it will feed into the downstream fiber path chute.

2. The drive roll assembly of claim 1 further comprising:
a rotatable cam wheel comprising the cam.

3. The drive roll assembly of claim 1 further comprising:
a pivot for mounting the ejector foot, whereby the ejector foot is mounted on the pivot for rocking motion relative to the drive roll.

4. The drive roll assembly of claim 1 further comprising:
a ramp surface formed on the ejector foot, whereby the cam rides on the ramp surface to displace the ejector foot away from the surface of the drive roll.

5. The drive roll assembly of claim 1 further comprising:
a return spring for the displaceable cutter, the return spring returning the displaceable cutter to the retracted position after the drive roll rotates the displaceable cutter past the cam.

6. The drive roll assembly of claim 1 further comprising:
a return spring for the ejector foot, whereby the return spring returns the ejector foot to the retracted position after the drive roll rotates the ejector foot past the cam.

7. The drive roll assembly of claim 1 further comprising:
two cutter mechanisms mounted on the drive roll, the cutter mechanisms being spaced one hundred and eighty degrees apart around the circumference of the drive roll.

8. The drive roll assembly of claim 7 further comprising:
two ejector mechanisms mounted on the drive roll, the ejector mechanisms being spaced one hundred and eighty degrees apart around the circumference of the drive roll.

9. The drive roll assembly of claim 1 further comprising:
a post for mounting the ejector foot, whereby the ejector foot is mounted on the post for a linear plunging motion relative to the drive roll.

10. The drive roll assembly of claim 9 further comprising:
a ramp surface formed on the ejector foot, whereby the cam rides on the ramp surface to displace the ejector foot away from the surface of the drive roll.

11. The drive roll assembly of claim 9 further comprising:
a return spring for the ejector foot, whereby the return spring returns the ejector foot to the retracted position after the drive roll rotates the ejector foot past the cam.

12. A drive roll assembly for a fiber placement head for applying fiber composite material to an application surface, the drive roll assembly comprising:
a drive roll and a backup roll comprising the drive roll assembly;
a drive roll nip formed between the drive roll and the backup roll;
at least one cutter mechanism mounted on the drive roll for cutting fiber composite material;
a cam mounted inside the outer surface of the drive roll;
a displaceable cutter comprising the cutter mechanism, the cam actuating the displaceable cutter from a retracted position to sever the fiber composite material;
an ejector mechanism mounted on the drive roll behind the cutter mechanism, the ejector mechanism positively displacing the leading end of the cut fiber composite material away from the surface of the drive roll;
an ejector foot comprising the ejector mechanism;
a surface on the ejector foot for engaging the cam, whereby the ejector foot is actuated from a retracted position by the cam to displace the leading end of the cut fiber composite material away from the surface of the drive roll;
a drive transfer arrangement between the drive roll and the backup roll, whereby rotation of the drive roll is synchronized with the rotation of the backup roll;
at least one cutter mounted on the drive roll; and,
an anvil mounted on the backup roll; whereby the drive transfer arrangement between the drive roll and the backup roll synchronizes the rotation of the drive roll and the backup roll so that the at least one cutter on the drive roll impacts the anvil on the backup roll when the cutter on the drive roll is opposite the anvil on the backup roll.

13. The drive roll assembly of claim 12 wherein the drive roll has an outer diameter and the backup roll has an outer diameter, and wherein the outer diameter of the drive roll is twice the outer diameter of the backup roll.

14. The drive roll assembly of claim 13 further comprising:
two cutters mounted on the drive roll, whereby the drive transfer arrangement between the drive roll and the backup roll causes each of the two cutters to impact the anvil on the backup roll at two rotational positions of the drive roll.

* * * * *